(12) United States Patent
Bartosz et al.

(10) Patent No.: US 10,703,491 B2
(45) Date of Patent: Jul. 7, 2020

(54) AIRCRAFT CABIN AIR MONITOR

(71) Applicant: Hamilton Sundstrand Corporation, Charlotte, NC (US)

(72) Inventors: Lance R. Bartosz, Granby, MA (US); Catherine Thibaud, South Windsor, CT (US); Joseph V. Mantese, Ellington, CT (US); Brian St. Rock, Andover, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 195 days.

(21) Appl. No.: 15/824,316

(22) Filed: Nov. 28, 2017

(65) Prior Publication Data

US 2019/0161195 A1 May 30, 2019

(51) Int. Cl.
| | |
|---|---|
| *B64D 13/08* | (2006.01) |
| *B64D 45/00* | (2006.01) |
| *B01D 46/44* | (2006.01) |
| *B64D 13/06* | (2006.01) |

(52) U.S. Cl.
CPC ........... *B64D 13/08* (2013.01); *B01D 46/442* (2013.01); *B64D 13/06* (2013.01); *B64D 45/00* (2013.01); *B64D 2013/064* (2013.01); *B64D 2013/0618* (2013.01); *B64D 2013/0651* (2013.01); *B64D 2013/0662* (2013.01); *B64D 2013/0681* (2013.01); *B64D 2013/0688* (2013.01)

(58) Field of Classification Search
CPC ............ B64D 13/08; B64D 2013/0618; B64D 2013/064; B64D 2013/0651; B64D 2013/0662; B64D 2013/0681; B64D 2013/0688
See application file for complete search history.

(56) References Cited

U.S. PATENT DOCUMENTS

| | | | | |
|---|---|---|---|---|
| 4,209,993 A | * | 7/1980 | Rannenberg | B60H 1/32 62/239 |
| 5,086,622 A | * | 2/1992 | Warner | B64D 13/06 62/88 |

(Continued)

FOREIGN PATENT DOCUMENTS

| | | |
|---|---|---|
| EP | 1188666 A1 | 3/2002 |
| EP | 3090950 A1 | 11/2016 |

(Continued)

OTHER PUBLICATIONS

Extended European Search Report for European Application No. 18208795.7; Date of Completion: Jan. 17, 2019; dated Jan. 25, 2019; 9 Pages.

(Continued)

*Primary Examiner* — Nelson J Nieves
(74) *Attorney, Agent, or Firm* — Cantor Colburn LLP

(57) ABSTRACT

An environmental control system that includes a first environmental control system pack, a first recirculation fan assembly, and a cabin air sensor unit. The first environmental control system pack is arranged to provide conditioned air to an aircraft cabin. The first recirculation fan assembly is arranged to recirculate a first cabin air fluid flow back to the aircraft cabin. The cabin air sensor unit is arranged to provide a first air quality signal indicative of an air quality of the first cabin air fluid flow to a controller.

8 Claims, 2 Drawing Sheets

(56) References Cited

U.S. PATENT DOCUMENTS

| | | | |
|---|---|---|---|
| 5,695,396 A * | 12/1997 | Markwart | B64D 13/00 454/76 |
| 5,791,982 A | 9/1998 | Curry | |
| 5,899,085 A * | 5/1999 | Williams | B64D 13/06 62/236 |
| 6,401,473 B1 * | 6/2002 | Ng | B64D 13/06 454/71 |
| 6,823,727 B2 | 11/2004 | Friedel et al. | |
| 7,871,038 B2 * | 1/2011 | Space | B64D 13/06 244/118.5 |
| 9,394,055 B2 * | 7/2016 | Markwart | B64D 13/00 |
| 2012/0285184 A1 * | 11/2012 | Voinov | B64D 13/06 62/87 |
| 2015/0246729 A1 * | 9/2015 | Ng | B64D 13/06 454/73 |
| 2016/0214723 A1 | 7/2016 | Fox | |
| 2017/0080374 A1 | 3/2017 | Fox | |
| 2017/0355466 A1 * | 12/2017 | Galzin | B64D 13/06 |
| 2018/0134397 A1 * | 5/2018 | Himmelmann | B64D 15/04 |
| 2018/0148182 A1 * | 5/2018 | Fagundes | B64D 13/06 |
| 2018/0162535 A1 * | 6/2018 | Army | B64D 13/06 |
| 2018/0215472 A1 * | 8/2018 | DeFrancesco | B64D 13/04 |
| 2018/0215474 A1 * | 8/2018 | DeFrancesco | B64D 13/04 |
| 2018/0281977 A1 * | 10/2018 | DeFrancesco | B64D 13/08 |
| 2018/0331599 A1 * | 11/2018 | Parlante | F25B 31/026 |
| 2019/0009912 A1 * | 1/2019 | Matsui | B64D 13/06 |
| 2019/0135441 A1 * | 5/2019 | Bruno | B64D 13/06 |

FOREIGN PATENT DOCUMENTS

| | | |
|---|---|---|
| GB | 2015723 A | 9/1979 |
| WO | 2016189420 A1 | 12/2016 |

OTHER PUBLICATIONS

European Office Action; Application No. 18208795.7; dated Mar. 13, 2020; 7 pages.

* cited by examiner

AIRCRAFT CABIN AIR MONITOR

BACKGROUND

Illustrative embodiments pertain to the art of environmental control systems

Aircraft are provided with an environmental control system that is configured to provide conditioned air to an aircraft cabin. The environmental control system may include ram air cooled heat exchangers and an air conditioning pack that supplies the conditioned air to the aircraft cabin.

BRIEF DESCRIPTION

Disclosed is an environmental control system that includes a first environmental control system pack, a first recirculation fan assembly, and a cabin air sensor unit. The first environmental control system pack has a first inlet that receives a first fluid flow from a first air source and a first outlet. The first recirculation fan assembly has a first recirculation inlet that receives a first cabin air fluid flow from an aircraft cabin and a first recirculation outlet. The cabin air sensor unit is in fluid communication with the first recirculation outlet. The cabin air sensor unit is arranged to provide a first air quality signal indicative of an air quality of the first cabin air fluid flow to a controller.

In addition to one or more of the features described herein, the controller is in communication with the first environmental control system pack.

In addition to one or more of the features described herein, the first outlet provides the first fluid flow to a mixing manifold.

In addition to one or more of the features described herein, the first recirculation outlet provides the first cabin air fluid flow to the mixing manifold.

In addition to one or more of the features described herein, a second environmental control system pack has a second inlet that receives a second fluid flow from a second air source and a second outlet that provides the second fluid flow to the mixing manifold.

In addition to one or more of the features described herein, a second recirculation fan assembly has a second recirculation inlet that receives a second cabin air fluid flow from the aircraft cabin and a second recirculation outlet that provides the second cabin air fluid flow to the mixing manifold.

In addition to one or more of the features described herein, the cabin air sensor unit is in fluid communication with the second recirculation outlet.

In addition to one or more of the features described herein, the cabin air sensor unit is arranged to provide a second air quality signal indicative of an air quality of the second cabin air fluid flow to the controller.

In addition to one or more of the features described herein, the controller is programmed to, responsive to the first air quality signal being indicative of the air quality of the first cabin air fluid flow being less than a threshold, output for display an indicator.

In addition to one or more of the features described herein, the controller is programmed to, responsive to the second air quality signal being indicative of the air quality of the second cabin air fluid flow being less than a threshold, output for display an indicator.

Also disclosed is an environmental control system that includes a first environmental control system pack, a first recirculation fan assembly, and a cabin air sensor unit. The first environmental control system pack has a first inlet that receives a first fluid flow from a first air source, a first heat exchanger fluidly connected to and disposed downstream of the first inlet, a first condenser fluidly connected to and disposed downstream of the first heat exchanger, and a first outlet that provides the first fluid flow to a mixing manifold. The first recirculation fan assembly has a first recirculation inlet that receives a first cabin air fluid flow from an aircraft cabin and a first recirculation outlet that provides the first cabin air fluid flow to the mixing manifold. The cabin air sensor unit is in fluid communication with at least one of an outlet of the first heat exchanger, an outlet of the first condenser, and the first recirculation outlet.

In addition to one or more of the features described herein, the cabin air sensor unit is arranged to provide a first air quality signal indicative of an air quality of at least one of the first fluid flow and the first cabin air fluid flow to a controller.

In addition to one or more of the features described herein, the controller is programmed to, responsive to the first air quality signal being less than a threshold, output for display an indicator.

In addition to one or more of the features described herein, a second environmental control system pack has a second inlet that receives a second fluid flow from a second air source, a second heat exchanger fluidly connected to and disposed downstream of the second inlet, a second condenser fluidly connected to and disposed downstream of the second heat exchanger.

In addition to one or more of the features described herein, a second outlet provides the second fluid flow to the mixing manifold; and a second recirculation fan assembly has a second recirculation inlet that receives a second cabin air fluid flow from the aircraft cabin and a second recirculation outlet that provides the second cabin air fluid flow to the mixing manifold.

In addition to one or more of the features described herein, the cabin air sensor unit is in fluid communication with at least one of an outlet of the second heat exchanger, an outlet of the second condenser, and the second recirculation outlet.

In addition to one or more of the features described herein, the cabin air sensor unit being arranged to provide a second air quality signal indicative of an air quality of at least one of the second fluid flow and the second cabin air fluid flow to the controller.

In addition to one or more of the features described herein, the controller is programmed to, responsive to the second air quality signal being less than a threshold, output for display an indicator.

Further disclosed is an environmental control system that includes a first environmental control system pack and a first recirculation fan assembly. The first environmental control system pack has a first inlet that receives a first fluid flow from a first air source and a first outlet that provides the first fluid flow to a mixing manifold. The first recirculation fan assembly has a first recirculation inlet that receives a first cabin air fluid flow from an aircraft cabin, a fan, a first recirculation outlet that provides the first cabin air fluid flow to the mixing manifold, and a cabin air sensor.

In addition to one or more of the features described herein, the first recirculation fan assembly includes a fan controller in communication with the fan and a controller that is in communication with the first environmental control system.

In addition to one or more of the features described herein, the cabin air sensor is arranged to provide a first air quality signal indicative of an air quality of the first cabin air fluid flow to the fan controller.

In addition to one or more of the features described herein, the cabin air sensor is in fluid communication with the first recirculation outlet and the first recirculation inlet.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
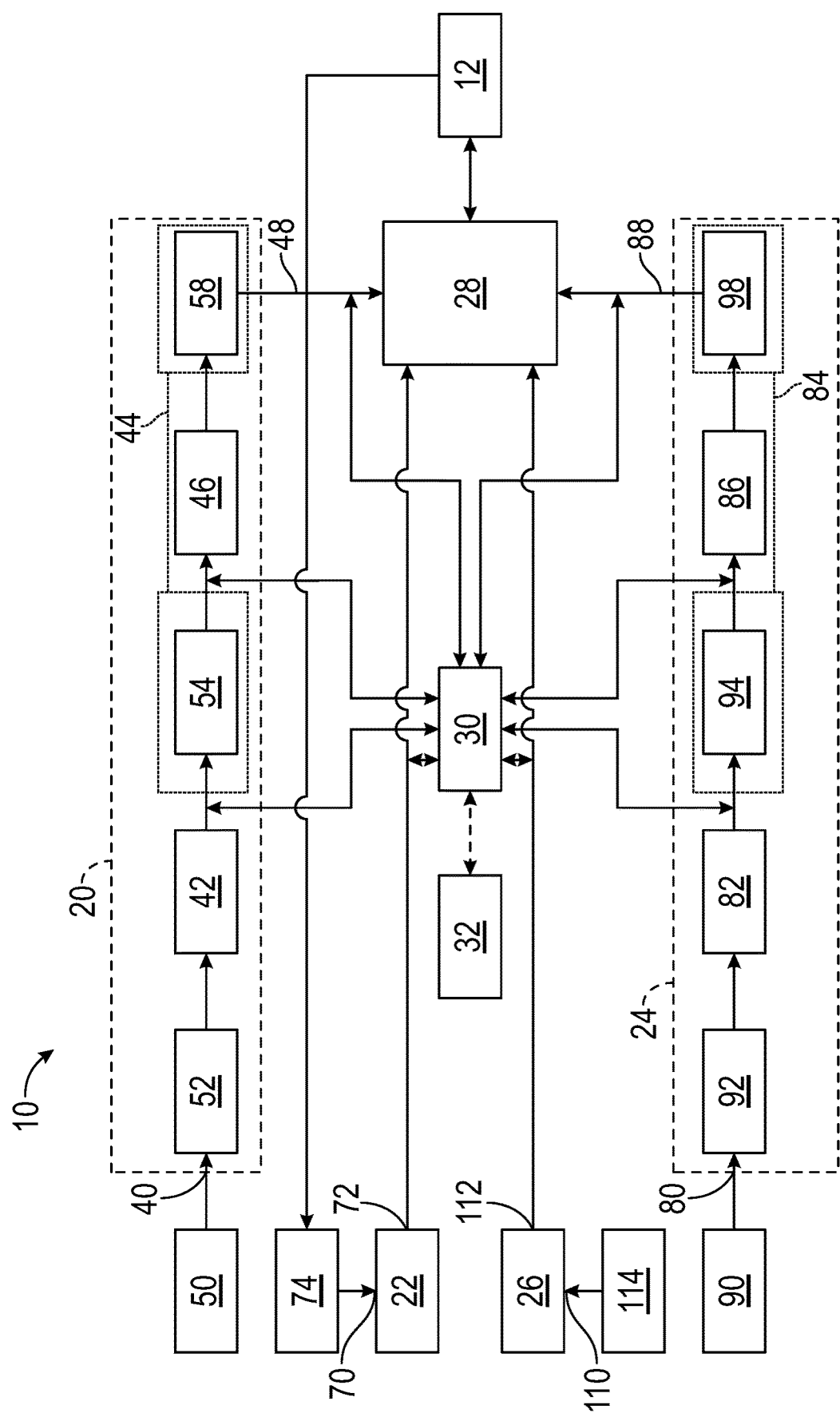
FIG. 1 is a schematic illustration of an environmental control system.

Referring to FIG. 1, a schematic diagram of an environmental control system 10 for an aircraft is illustrated. The environmental control system 10 is configured to receive ambient air from an air scoop of the aircraft and/or pressurized air from an engine such as a gas turbine engine of the aircraft. In at least one embodiment, the environmental control system 10 is configured to receive pressurized air supplied from the cabin air compressor or supercharger that may be powered independently of the gas turbine engine.

The environmental control system 10 is arranged to condition the received air, regardless of source, and provide conditioned air to a cockpit or cabin 12 of the aircraft. The environmental control system 10 includes a first environmental control system pack 20 having an associated first recirculation fan assembly 22, a second environmental control system pack 24 having an associated second recirculation fan assembly 26, a mixing manifold 28, a cabin air sensor unit 30, and a controller 32.

The first environmental control system pack 20 includes a first inlet 40, a first heat exchanger 42, a first turbo compressor assembly 44, a first condenser 46, and a first outlet 48. The first inlet 40 is arranged to receive a first fluid flow from a first air source 50, such as ambient air or pressurized air from a gas turbine engine. The first fluid flow may pass through a first ozone converter 52 prior to entering the first heat exchanger 42. The first heat exchanger 42 is fluidly connected to and is disposed downstream of the first inlet 40.

The first turbo compressor assembly 44 is fluidly connected to and is disposed downstream of the first heat exchanger 42. The first turbo compressor assembly 44 includes a first compressor 54 and a first turbine 58. The first compressor 54 is fluidly connected to and is disposed downstream of the first heat exchanger 42. The first condenser 46 is fluidly connected to and is disposed downstream of the first compressor 54. The first turbine 58 is fluidly connected to and is disposed downstream of the first condenser 46. The first outlet 48 is fluidly connected to the first turbine 58 and provides the first fluid flow to the mixing manifold 28.

The first environmental control system pack 20 may have alternative arrangements that may include additional components or may remove certain components or rearrange the previously described components.

The first recirculation fan assembly 22 is fluidly connected to the cabin 12 and the mixing manifold 28. The first recirculation fan assembly 22 is arranged to receive a first cabin air fluid flow from the cabin 12 and provide the first cabin air fluid flow to the mixing manifold 28 that provides a mixed fluid flow to the cabin 12.

The first recirculation fan assembly 22 includes a first recirculation inlet 70 and a first recirculation outlet 72. The first recirculation inlet 70 receives the first cabin air fluid flow from the cabin 12. The first cabin air fluid flow may pass through a first particulate filter 74 that is disposed proximate the first recirculation inlet 70. The first recirculation outlet 72 is fluidly connected to the first recirculation inlet 70 and provides the first cabin air fluid flow to the mixing manifold 28.

The second environmental control system pack 24 includes a second inlet 80, a second heat exchanger 82, a second turbo compressor assembly 84, a second condenser 86, and a second outlet 88. The second inlet 80 is arranged to receive a second fluid flow from a second air source 90, such as ambient air or pressurized air from a gas turbine engine. The second fluid flow may pass through a second ozone converter 92 prior to entering the second heat exchanger 82. The second heat exchanger 82 is fluidly connected to and is disposed downstream of the second inlet 80.

The second turbo compressor assembly 84 is fluidly connected to and is disposed downstream of the second heat exchanger 82. The second turbo compressor assembly 84 includes a second compressor 94, and a second turbine 98. The second compressor 94 is fluidly connected to and is disposed downstream of the second heat exchanger 82. The second condenser 86 is fluidly connected to and is disposed downstream of the second compressor 94. The second turbine 98 is fluidly connected to and is disposed downstream of the second condenser 86. The second outlet 88 is fluidly connected to the second turbine 98 and provides the second fluid flow to the mixing manifold 28.

The second environmental control system pack 24 may have alternative arrangements that may include additional components or may remove certain components or rearrange the previously described components.

The second recirculation fan assembly 26 is fluidly connected to the cabin 12 and the mixing manifold 28. The second recirculation fan assembly 26 is arranged to receive a second cabin air fluid flow from the cabin 12 and provide the second cabin air fluid flow to the mixing manifold 28 that provides the mixed fluid flow to the cabin 12.

The second recirculation fan assembly 26 includes a second recirculation inlet 110 and a second recirculation outlet 112. The second recirculation inlet 110 receives the second cabin air fluid flow from the cabin 12. The second cabin air fluid flow may pass through a second particulate filter 114 that is disposed proximate the second recirculation inlet 110. The second recirculation outlet 112 is fluidly connected to the second recirculation inlet 110 and provides the first cabin air fluid flow to the mixing manifold 28.

The mixing manifold 28 mixes the first fluid flow from the first environmental control system pack 20 with the first cabin air fluid flow from the first recirculation fan assembly 22 and also mixes the second fluid flow from the second environmental control system pack 24 with the second cabin air fluid flow from the second recirculation fan assembly 26. The mixing manifold 28 provides the mixed fluid flows to the cabin 12.

The cabin air sensor unit 30 includes sensing elements that are arranged to detect the presence of impurities or contaminants of at least one of the first fluid flow, the first cabin air fluid flow, the second fluid flow, or the second cabin air fluid flow. Examples of impurities or contaminants that may be detected are ozone, CO2, CO, VOC, TCP, SVOC, oil vapors, etc. In at least one embodiment, the cabin air sensor unit 30 may sense or determine a particle count or contaminant/impurity mass concentration.

Figure 2:
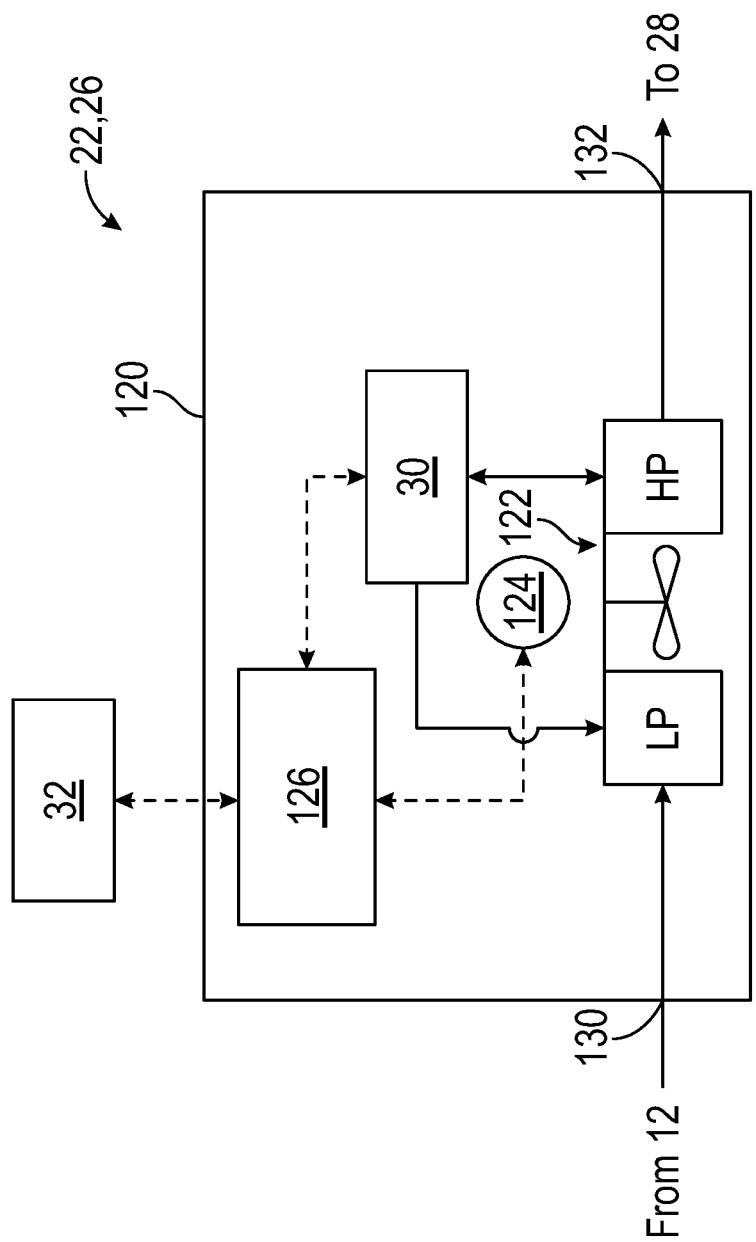
FIG. 2 is a schematic illustration of a fan assembly having a cabin air sensor unit.

The cabin air sensor unit 30 may be a stand-alone sensor, as shown in FIG. 1, or may be incorporated into at least one of the first recirculation fan assembly 22 or the second recirculation fan assembly 26, as shown in FIG. 2.

Referring to FIG. 1, the cabin air sensor unit 30 is in fluid communication with an outlet of the first heat exchanger 42 or an inlet to the first compressor 54, an inlet to the first condenser 46, the first recirculation outlet 72, the first outlet 48, or an inlet to the mixing manifold 28. The cabin air sensor unit 30 may also be in fluid communication with an outlet of the second heat exchanger 82 or an inlet to the second compressor 94, an inlet to the second condenser 86, the second recirculation outlet 112, the second outlet 88, or an inlet to the mixing manifold 28.

The cabin air sensor unit 30 is in communication with the controller 32 that may quantify the concentration level or particle count of impurities/contaminants or determine a level of air quality of at least one of the first fluid flow, the first cabin air fluid flow, the second fluid flow, or the second cabin air fluid flow prior to delivery to the cabin 12. The cabin air sensor unit 30 is arranged to provide a first air quality signal indicative of a level of air quality of at least one of the first fluid flow or the first cabin air fluid flow to the controller 32. The cabin air sensor unit 30 is also arranged to provide a second air quality signal indicative of a level of air quality of the second fluid flow or the second cabin air fluid flow to the controller 32.

Referring to FIG. 2, the cabin air sensor unit 30 may be integrated into at least one of the first recirculation fan assembly 22 and/or the second recirculation fan assembly 26. In such an arrangement, the first recirculation fan assembly 22 and/or the second recirculation fan assembly 26 includes a fan housing 120, a fan 122, a fan motor 124, a fan controller 126, and the cabin air sensor unit 30.

The fan housing 120 defines a recirculation inlet 130 that receives a cabin air fluid flow from the cabin 12 and defines a recirculation outlet 132 that provides the cabin air fluid flow to the mixing manifold 28.

The fan 122 is disposed within the fan housing 120 and is driven by the fan motor 124. The fan motor 124 is in communication with and is controlled by the fan controller 126. The fan controller 126 is in communication with the controller 32 and the cabin air sensor unit 30. The fan controller 126 may provide power to the cabin air sensor unit 30 and may provide an air quality signal from the cabin air sensor unit 30 to the controller 32.

The integration of the cabin air sensor unit 30 into the fan housing 120 of the first recirculation fan assembly 22 or the second recirculation fan assembly 26 enables the fan 122 to induce flow across sensing elements of the cabin air sensor unit 30. Furthermore, the integration of the cabin air sensor unit 30 into the fan housing 120 enables the cabin air sensor unit 30 to utilize existing communication channels of the recirculation fan assembly to communicate with the controller 32. As well as ensure that air is sampled from air sources to the environmental control system 10.

The controller 32 is in communication with the first environmental control system pack 20, the second environmental control system pack 24, and the cabin air sensor unit 30. The controller 32 is programmed to, responsive to at least one of the first air quality signal or the second air quality signal being indicative of an air quality less than a threshold, output for display and indicator. The first air quality signal or the second air quality signal being indicative of an air quality less than threshold may indicate that the controller 32 or the cabin air sensor unit 30 has quantified the concentration level or particle count of impurities/contaminants of at least one of the first fluid flow, the first cabin air fluid flow, the second fluid flow, or the second cabin air fluid flow to be greater than a threshold.

The controller 32 is programmed to, responsive to at least one of the first air quality signal or the second air quality signal being indicative of an air quality less than a threshold, the controller 32 may inhibit the fluid flow from the first outlet 48 of the first environmental control system pack 20 or the second outlet 88 of the second environmental control system pack 24. For example, should the first air quality signal indicative of an air quality less than a threshold and the second air quality signal indicative of an air quality greater than the threshold, the controller 32 may inhibit the fluid flow from the first outlet 48 of the first environmental control system pack 20. Therefore, should the second air quality signal be indicative of an air quality less than the threshold and the first air quality signal be indicative of an air quality greater than threshold, the control 32 may inhibit the fluid flow.

The environmental control system 10 having a cabin air sensor unit 30 enables the environmental control system 10 to detect the presence of impurities or contaminants in the air and make quantify the concentration level of the impurities or contaminants enabling a tiered response level, i.e. warning indicator, automatic corrective action, etc.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system, comprising:
 a first environmental control system pack having a first inlet that receives a first fluid flow from a first air source and a first outlet, wherein the first outlet provides the first fluid flow to a mixing manifold;
a first recirculation fan assembly having a first recirculation inlet that receives a first cabin air fluid flow from an aircraft cabin and a first recirculation outlet;
a cabin air sensor unit in fluid communication with the first recirculation outlet, the cabin air sensor unit being arranged to provide a first air quality signal indicative of an air quality of the first cabin air fluid flow to a controller, wherein the controller is in communication with the first environmental control system pack, wherein the cabin air sensor unit is in fluid communication with the second recirculation outlet;
a second environmental control system pack having a second inlet that receives a second fluid flow from a second air source and a second outlet that provides the second fluid flow to the mixing manifold; and
a second recirculation fan assembly having a second recirculation inlet that receives a second cabin air fluid flow from the aircraft cabin and a second recirculation outlet that provides the second cabin air fluid flow to the mixing manifold,
wherein the cabin air sensor unit is arranged to provide a second air quality signal indicative of an air quality of the second cabin air fluid flow to the controller.

2. The environmental control system of claim 1, wherein the controller is programmed to, responsive to the first air quality signal being indicative of the air quality of the first cabin air fluid flow being less than a threshold, output for display an indicator.

3. The environmental control system of claim 1, wherein the controller is programmed to, responsive to the second air quality signal being indicative of the air quality of the second cabin air fluid flow being less than a threshold, output for display an indicator.

4. The environmental control system of claim 1, wherein the controller is programmed to, responsive to the first air quality signal being indicative of the air quality of the first cabin air fluid flow being less than a threshold, output for display an indicator; wherein the controller is programmed to, responsive to the second air quality signal being indicative of the air quality of the second cabin air fluid flow being less than a threshold, output for display an indicator.

5. The environmental control system of claim 4, wherein when first air quality signal indicates an air quality less than a threshold and the second air quality signal indicative of an air quality greater than the threshold, the controller inhibits the fluid flow from the first outlet of the first environmental control system pack.

6. An environmental control system, comprising:
a first environmental control system pack having a first inlet that receives a first fluid flow from a first air source, a first heat exchanger fluidly connected to and disposed downstream of the first inlet, a first condenser fluidly connected to and disposed downstream of the first heat exchanger, and a first outlet that provides the first fluid flow to a mixing manifold;
a first recirculation fan assembly having a first recirculation inlet that receives a first cabin air fluid flow from an aircraft cabin and a first recirculation outlet that provides the first cabin air fluid flow to the mixing manifold; and
a cabin air sensor unit is in fluid communication with at least one of an outlet of the first heat exchanger, an outlet of the first condenser, and the first recirculation outlet,
wherein the cabin air sensor unit is arranged to provide a first air quality signal indicative of an air quality of at least one of the first fluid flow and the first cabin air fluid flow to a controller;
a second environmental control system pack having a second inlet that receives a second fluid flow from a second air source, a second heat exchanger fluidly connected to and disposed downstream of the second inlet, a second condenser fluidly connected to and disposed downstream of the second heat exchanger, and a second outlet that provides the second fluid flow to the mixing manifold; and
a second recirculation fan assembly having a second recirculation inlet that receives a second cabin air fluid flow from the aircraft cabin and a second recirculation outlet that provides the second cabin air fluid flow to the mixing manifold,
wherein the cabin air sensor unit is in fluid communication with at least one of an outlet of the second heat exchanger, an outlet of the second condenser, and the second recirculation outlet,
wherein the cabin air sensor unit being arranged to provide a second air quality signal indicative of an air quality of at least one of the second fluid flow and the second cabin air fluid flow to the controller.

7. The environmental control system of claim 6, wherein the controller is programmed to, responsive to the first air quality signal being less than a threshold, output for display an indicator.

8. The environmental control system of claim 6, wherein the controller is programmed to, responsive to the second air quality signal being less than a threshold, output for display an indicator.

* * * * *